Oct. 7, 1941.　　　　J. C. HORNUNG　　　　2,258,056
GAUGE FOR LAWN MOWER SHARPENING DEVICES
Filed Aug. 14, 1940　　　　2 Sheets-Sheet 1
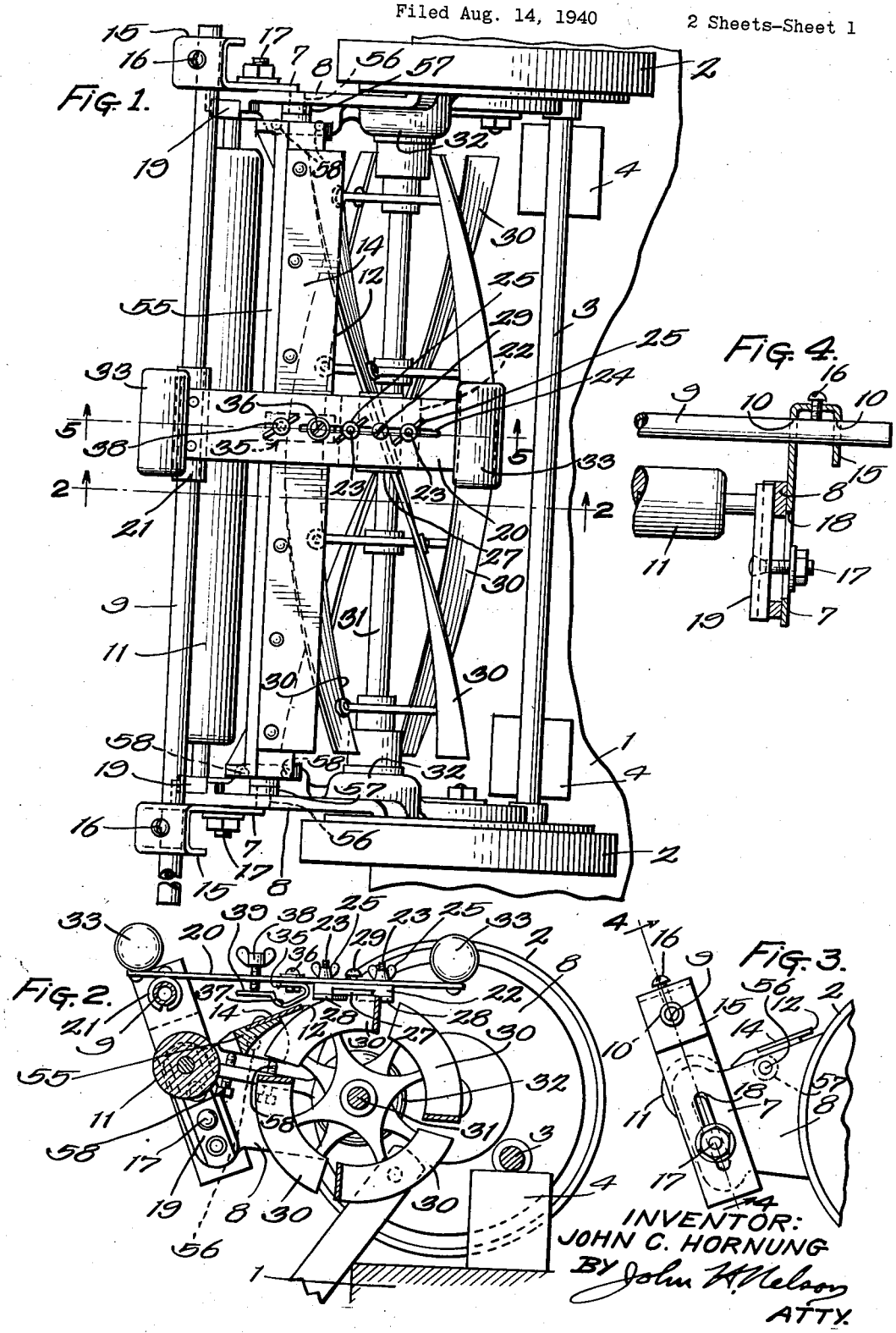
INVENTOR:
JOHN C. HORNUNG
BY John H. Nelson
ATTY.

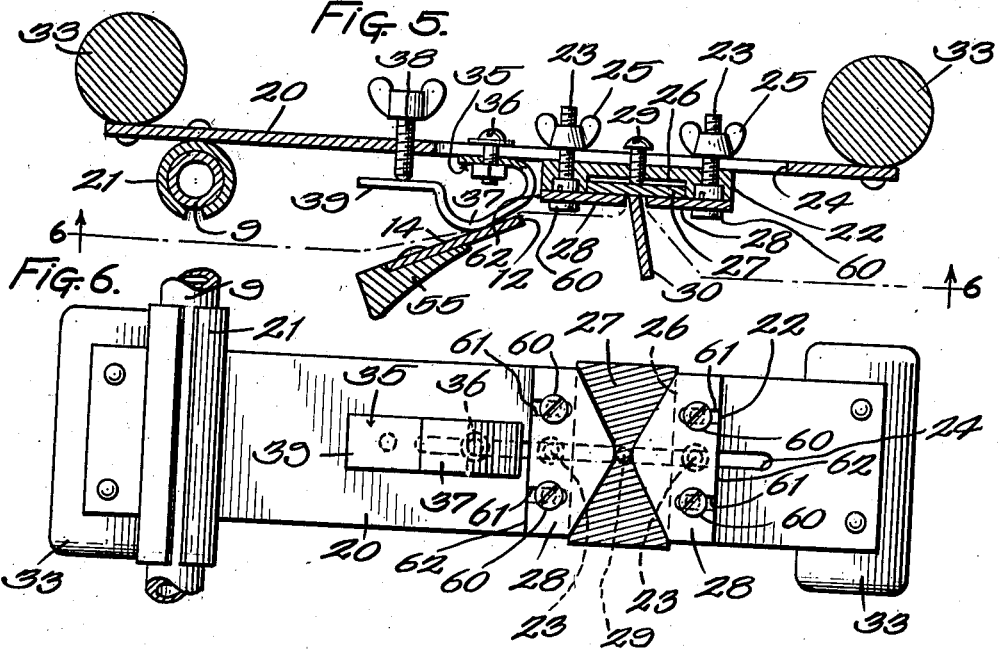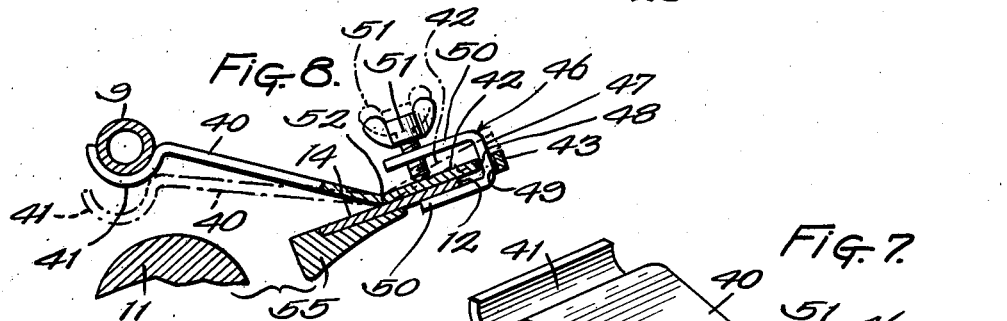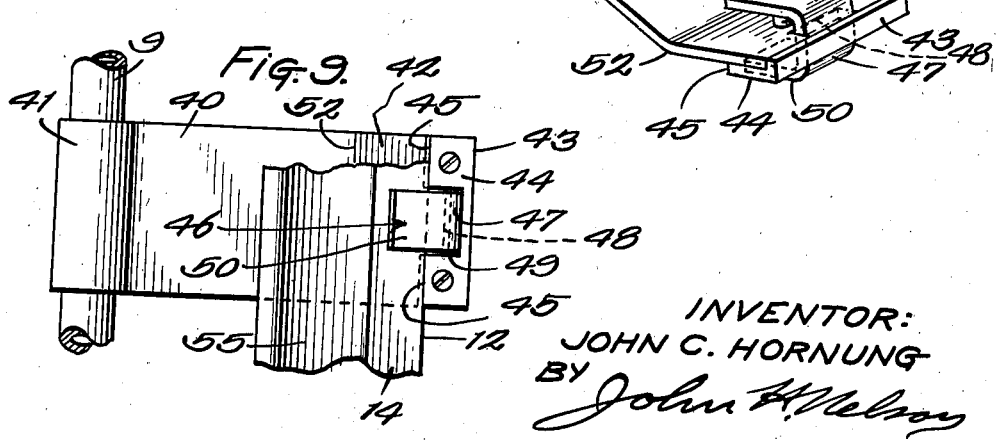

Patented Oct. 7, 1941

2,258,056

UNITED STATES PATENT OFFICE 2,258,056

GAUGE FOR LAWN MOWER SHARPENING DEVICES

John C. Hornung, Glencoe, Ill.

Application August 14, 1940, Serial No. 352,579

3 Claims. (Cl. 33—181)

This invention relates to lawn mower sharpening devices, and more particularly pertains to a device of this character designed to be detachably mounted on the mower for the sharpening operation.

One of the primary objects of the invention is to provide such a device of the simplest construction that may be employed on ordinary domestic lawn mowers of various sizes and yet be capable of sharpening same to a high degree of precision.

One of the difficulties encountered in sharpening the rotatable helical blades of a mower is that the shearing plate of the mower with which the blades cooperate is not always parallel with the axis of rotation of the blades as it should be in the ordinary type of mowers with which this invention is primarily concerned. This may be due to slight dislocation of parts of the mower after long usage, wearing of the parts, or faulty adjustment of the parts.

Therefore, more particularly, the object is to provide a lawn mower sharpener that will overcome the difficulty mentioned, and wherein a manually actuated sharpening head is employed to sharpen the rotatable blades of the mower and being designed for movement back and forth along the cutting edge of a blade to sharpen same, and wherein the head is positively guided during its said movement in parallelism with the shearing edge of the shearing plate of the mower to sharpen the blade to a given depth in conformity therewith so as to be capable of a more perfect shearing action with the plate than heretofore made possible.

In carrying out the objects of the invention outlined in the foregoing, the sharpening head is guided for its said movement by an elongated guide provided with means for adjustably mounting same on a mower in parallelism with the shearing edge of the shearing plate thereof. Therefore, to make it possible for an operator to so mount the guide with the assurance that it will be positioned in parallelism with the plate, a further object of the invention is to provide detachable gauge means for this purpose and that will temporarily support the guide at a given location with respect to the plate while the guide is being mounted on the mower.

The foregoing and other objects will become more apparent by reference to the specification and the accompanying drawings, in which:

Fig. 1 is a plan view of an ordinary medium sized lawn mower supported in an inverted position upon a table or bench with the sharpening device of the invention attached to the mower and as seen in plan.

Fig. 2 is a cross-section of the mower, as taken substantially on the section line 2—2 of Fig. 1, showing the sharpening head in the position it assumes during the initial sharpening operation of a blade of the mower.

Fig. 3 is a fragmentary end elevation of the mower illustrating the mounting means for the guide.

Fig. 4 is a detail section taken substantially on the section line 4—4 of Fig. 3.

Fig. 5 is an enlarged detail section taken substantially on the section line 5—5 of Fig. 1, illustrating the sharpening head in the position it assumes during the final sharpening operation of a blade.

Fig. 6 is a bottom plan view of parts seen in Fig. 5, as viewed from the section line 6—6 of Fig. 5.

Fig. 7 is a view in perspective of the gauge means of the invention.

Fig. 8 is a sectional elevation of the gauge means as applied between the shearing plate of the mower and the guide of the invention.

Fig. 9 is a bottom plan of the parts seen in Fig. 8.

It is to be understood that while the drawings illustrate only one embodiment of the invention, certain changes or alterations may be made without departing from the spirit or scope of the invention.

The sharpening device is so constructed that it is more conveniently operated on a mower when same is supported in an inverted or upside down position upon any suitable support such as a bench 1 or the like, as seen in Figs. 1 and 2, with the driving wheels 2 of the mower being free to rotate. Although this may be accomplished in various ways, it may be advisable to have the tie rod 3 of the mower resting upon a pair of blocks 4 placed on the bench so that the driving wheels will clear the top of the bench.

As illustrated, the sharpening device includes a pair of elongated brackets 7 adapted to be detachably mounted, respectively, upon the outer sides of the end frame members 8 of the mower, with said brackets supporting an elongated guide member 9 in the form of a tube adjustably mounted in bearing apertures 10 formed in the top end portion of the brackets whereby the brackets may be adjustable along the tube into various positions with respect to each other to accommodate various sizes of mowers. The brackets are designed to support the guide tube 9 in spaced relation above the rear supporting roller 11 of the mower in parallelism with the shearing edge 12 of the shearing plate 14 of the mower, and whereby the tube may extend beyond the end frame members 8, especially when employed on a mower of the smaller size. To this end, each bracket is in the form of a section of a flat bar having its top end bent to provide a hook-like formation 15 with the bearing apertures 10 of the bracket being formed respectively in said hook-like formation and the main body of the bracket in coaxial alignment. In the base portion of the hook-like formation of each bracket is threaded a set screw 16 for engagement with the guide tube 9 to hold same in adjusted positions in the bearings 10 of the bracket. Each bracket is adjustably secured to its respective end frame of the mower by a bolt 17 of the mower which passes through the end frame and through a longitudinal slot 18 provided in the main body portion of the bracket to permit longitudinal and lateral adjustment thereof into position to properly locate the guide on the mower as heretofore mentioned. It may be stated that the bolts 17 also pass through and serve to hold the usual supporting brackets 19 at the ends of the roller 11 in adjusted positions on the inner side of the end frames.

Rotatably and reciprocably mounted on the guide tube 9 is a carrier 20 in the form of a section of a flat bar across one end of which is provided a slide 21 in the form of a split tubular section suitably secured on the carrier and being slidably and rotatably received on the guide tube, with the carrier arranged to extend from the slide over and beyond the shearing plate 14 of the mower during operation of the device. Mounted on the under side of the carrier for adjustment therealong is a sharpening head 22 in the form of a rectangular block having two upright threaded stems 23 passing through a longitudinal slot 24 in the carrier, with winged nuts 25 being provided on the stems for engagement with the carrier to hold the sharpening head in adjusted positions thereon. In the bottom side of the sharpening head 22 is a transverse slot 26 in which is received a sharpening element or tool 27 which is preferably in the form of a section of an ordinary file detachably mounted in said slot 26 by being clamped against a pair of guide plates 28 mounted on the under side of the head at each side of the slot therein, with a set screw 29 extending through the slot 24 of the carrier and threaded into the sharpening head for engagement with the file to clamp same against the guide plates.

The adjacent inner edges of the guide plates 28 taper toward each other to form an hour-glass-shaped guide groove within which the cutting edge portion of a rotatable helical blade 30 of the mower is adapted to be received and maintained in contact with the file 27 at such an angle as to cause the file to sharpen said blade edge with a slight relief as the sharpening head is moved back and forth therealong upon reciprocation of the carrier on the guide tube 9. In maintaining the blade in contact with the file 27 during said back and forth movement of the sharpening head, it will be seen that the blades of the mower will be oscillated with the shaft upon which they are mounted, as seen at 31, with said shaft being supported in the usual bearings 32 provided in the end frames of the mower.

To enable an operator to conveniently reciprocate the carrier with the use of both hands in causing the file to bear upon the blade at the desired pressure during the sharpening operation, each end of the carrier is provided with a suitable hand-grip or handle 33.

In accordance with the objects of the invention, means is provided whereby the operation of the file will be so controlled as to make it possible to determine the depth to which the file will sharpen a blade, and whereby the blades may be so sharpened in conformity with the shearing edge of the shearing plate as to be capable of a more perfect shearing action therewith. To this end, adjustably mounted on the under side of the carrier 20 is an adjustable stop 35 in the form of a fairly strong leaf spring having one end adjustably secured to the carrier by a bolt 36. The stop continues from the bolt 36 into a depending loop-like stop formation 37 adapted and arranged to engage the shearing plate 14 of the mower to limit rotative movement of the carrier on the guide tube 9 during the sharpening operation, and whereby rotative movement of the file with the carrier into sharpening relation with a blade of the mower will be limited. The stop formation 37 is adjustable toward or away from the shearing plate to regulate the limit to which the file is rotated with the carrier into sharpening relation with the blade. This is accomplished by an adjusting screw 38 threaded in the carrier and arranged to engage, so as to actuate, the free end portion 39 of the stop which continues under the carrier from the stop formation 37. The stop spring is so tensioned as to maintain the free end portion 39 thereof in contact with the adjusting screw 38 during adjustment thereof and whereby the stop formation 37 will be adjusted toward or away from the shearing plate. The bolt 36 passes through the slot 24 in the carrier so that the stop 35 may be adjusted into various positions therealong to accommodate various sizes of mowers.

To make it possible for an operator to expeditiously attach the brackets 7 on the end frames of the mower so that the guide tube 9 supported thereon will be in its proper position above the rear roller 11 of the mower in parallelism with the shearing edge of the shearing plate 14 of the mower, the invention contemplates the provision of a detachable gauge for this purpose. Referring to Figs. 7, 8 and 9, the gauge comprises a gauge member 40 in the form of a section of a flat bar having a channel formation 41 extending across one end providing a positioning saddle within which the guide tube 9 is adapted to be snugly received and positioned. The other end portion of the gauge member is bent angularly upward, as at 42, being arranged and adapted to be clamped onto the bottom side of the shearing plate 14 so that the guide tube supported in the saddle will be positioned above the rear roller 11 of the mower. Mounted on the end of the angular end portion 42 of the gauge member to extend thereacross is an angle piece 43 having one of its angular portions 44 extending under the said end portion 42 to provide a positioning shoulder or abutment 45 adapted to engage the shearing edge 12 of the shearing plate to position the gauge thereon so that the guide tube in the saddle will be in parallelism with the said shearing edge. A clamp is provided for clamping the gauge member onto the shearing plate and comprises a clamping member 46 in the form of a section of a flat bar bent in the form of a U whose base portion 47 passes through notches 48 and 49 formed respectively in the end of the angular gauge portion 42 and the angular portion 44 of the angle piece 43 forming a slot within which the said base portion of the clamp member is loosely maintained. The leg portions 50 of the clamp member are arranged to loosely receive the shearing plate and the angular portion 42 of the gauge member therebetween, with a clamping screw 51 being provided in one of the leg portions for engagement with the said portion 42 to clamp same onto the shearing plate.

Although the use of the gauge may be self evident, in view of the foregoing description, a general explanation of one way it may be employed to advantage will now be given. First the gauge may be secured to the mid section of the shearing plate, the guide tube placed in the saddle of the gauge and the brackets 7 supporting the guide tube then temporarily secured to the end frames of the mower. The gauge may then be shifted to one end of the shearing plate and then to its other end, with the brackets being adjusted upon said shifting of the gauge until the guide tube rests snugly in the saddle of the gauge, whereupon the gauge may be removed and whereby the sharpening device will be ready of use.

By so loosely mounting the clamp member on the gauge, it permits the angular portion 42 of the gauge to shift upward on the base of the clamp, after the clamping screw 51 has been released, allowing the gauge to pivot on the shearing plate at its ridge portion 52, from which the angular portion thereof continues, so as to remove the saddle 41 of the gauge from under the positioned guide tube 9, with the gauge being shown in dot and dash lines in its shifted position ready for removal in Fig. 8.

It has been found that the most practical method of employing the device of the invention is as follows.

First it is advisable to adjust the shearing plate 14 away from the path of the rotatable blades 30 of the mower to allow the blades to freely oscillate during the sharpening operation. All ordinary mowers of the type described have standard means for this purpose, and comprises an elongated bracket 55 upon which the shearing plate is mounted to extend therealong, with trunnions 56 arranged at the ends of the bracket and rotatably mounted in bearings 57 in the end frames 8 of the mower so that the shearing plate may be rotated into or out of shearing engagement with the rotatable blades 30. The shearing plate is held in adjusted positions by means of a pair of set screws 58 mounted on each end frame 8 and arranged to respectively engage the bracket 55 and urge same in opposite directions about its axis of rotation.

With the shearing plate properly adjusted as mentioned, the sharpening head 22 is lowered onto a blade of the mower with the blade disposed between the guide plates 28 and engaging the file 27. The head 22 is then adjusted along the carrier 20 so that the file will sharpen the blade at the desired angle of relief. The stop 35 is then adjusted to allow the file to remove only a slight amount of the cutting edge of the blade upon being moved back and forth therealong with the carrier before the stop will prevent further sharpening action of the file by engagement with the shearing plate. All the blades of the mower should then be filed down by the sharpening head with the stop so set before the stop is again adjusted to allow the head to sharpen the blades to a deeper depth, with this procedure being continued until it has been found by test that the blades have been properly sharpened.

The guide plates 28 are mounted on the sharpening head for adjustment toward and from each other to accommodate blades therebetween of various thicknesses. For this purpose, the guide plates are secured to the bottom side of the sharpening head 22 by means of screws 60 which extend through slots 61 formed in the plates to extend inward from the back edge 62 thereof. By so mounting the guide plates, it will be seen that same may be adjusted together crosswise of the file 27 to shift its point of contact with the blades of the mower in the event the file becomes dull after long usage.

Having thus described my invention, I claim:

1. Gauge means for cooperating to position an elongated guide at a given location on a lawn mower in parallelism with the shearing edge of the shearing plate of the mower comprising a gauge member having a saddle formation adapted to receive and support said guide, a shoulder formation on the member adapted to engage the shearing edge of the shearing plate to position said member thereon, and clamping means loosely mounted on the member for clamping the member onto the shearing plate.

2. A gauge for cooperating between two horizontally extending machine elements to temporarily support one upon the other in parallelism therewith preparatory to the mounting of the first mentioned element in said position including a gauge member having a saddle formation adapted to engage under said first element to support same, a positioning formation on the member adapted to engage over the latter element, releasable clamping means on the member for clamping same onto the latter element, and means on the member forming a fulcrum between the saddle formation and the positioning formation upon which the member may pivot on the latter element to remove the saddle and positioning formations from the elements after the mounting of the first element and upon release of the clamping means.

3. A gauge device having means for detachably supporting in a cooperative position one machine element upon another machine element including a gauge member adapted to be clamped onto the latter machine element, a positioning member mounted on the gauge member adapted to engage the latter machine element and having a notch in an edge thereof forming with said gauge member a slot, and releasable clamping means for clamping the gauge member onto the latter machine element including a U-shaped clamping member having its base loosely received in said slot and between the legs of which said gauge member and latter machine element are clamped.

JOHN C. HORNUNG.